United States Patent
Boden et al.

(10) Patent No.: US 9,524,244 B2
(45) Date of Patent: Dec. 20, 2016

(54) WRITE CACHE DESTAGING

(71) Applicant: GLOBALFOUNDRIES Inc., Grand Cayman (KY)

(72) Inventors: Ian Boden, Hampshire (GB); Geraint North, Manchester (GB); Lee J. Sanders, Hampshire (GB); David Sherwood, Manchester (GB)

(73) Assignee: GLOBALFOUNDRIES INC., Grand Cayman (KY)

(*) Notice: Subject to any disclaimer, the term of this patent is extended or adjusted under 35 U.S.C. 154(b) by 245 days.

(21) Appl. No.: 14/507,234

(22) Filed: Oct. 6, 2014

(65) Prior Publication Data

US 2015/0121008 A1    Apr. 30, 2015

(30) Foreign Application Priority Data

Oct. 24, 2013    (GB) .................................. 1318780.2

(51) Int. Cl.
  *G06F 12/00*    (2006.01)
  *G06F 12/08*    (2016.01)
  *G06F 3/06*    (2006.01)

(52) U.S. Cl.
  CPC ....... *G06F 12/0868* (2013.01); *G06F 12/0804* (2013.01); *G06F 3/0659* (2013.01); *G06F 12/0806* (2013.01); *G06F 2212/283* (2013.01)

(58) Field of Classification Search
  CPC .................................................. G06F 12/0866
  See application file for complete search history.

(56) References Cited

U.S. PATENT DOCUMENTS

| | | | | |
|---|---|---|---|---|
| 6,434,673 B1* | 8/2002 | Palanca | ............... | G06F 12/0859 711/100 |
| 7,961,745 B2* | 6/2011 | Jensen | ............... | H04L 12/5693 370/412 |
| 2006/0294301 A1* | 12/2006 | Zohar | ............... | G06F 3/0611 711/113 |
| 2008/0168234 A1* | 7/2008 | Gill | ............... | G06F 12/0804 711/134 |
| 2010/0174867 A1 | 7/2010 | Gill et al. | | |
| 2012/0096225 A1 | 4/2012 | Khawand et al. | | |
| 2013/0111106 A1 | 5/2013 | Benhase et al. | | |
| 2014/0006743 A1* | 1/2014 | Biswas | ............... | G06F 9/5033 711/167 |

(Continued)

*Primary Examiner* — David X Yi
*Assistant Examiner* — Arvind Talukdar
(74) *Attorney, Agent, or Firm* — Michael LeStrange; Andrew M. Calderon; Roberts Mlotkowski Safran Cole & Calderon P.C.

(57) ABSTRACT

Disclosed is a system for controlling write actions to a plurality of data storage devices, the system comprising a plurality of write caches, wherein each cache is associated with a set of said data storage devices; and a controller adapted to issue write permissions to said data storage devices, said write permissions including a permission to perform a data destage operation from a cache to a data storage device; wherein each cache has a first performance score expressed as the difference between the number of data destage operations said cache has in flight and the maximum number of data destage actions said cache is permitted to issue in parallel; and wherein the controller is adapted to offer a data destage operation permission to the cache in said plurality of caches associated with the highest first performance score.

12 Claims, 5 Drawing Sheets

(56) References Cited

U.S. PATENT DOCUMENTS

| | | | |
|---|---|---|---|
| 2014/0195699 A1* | 7/2014 | Sokol, Jr. | G06F 13/18 710/40 |
| 2014/0229673 A1* | 8/2014 | Colgrove | G06F 3/0617 711/114 |

* cited by examiner

WRITE CACHE DESTAGING

FIELD OF THE INVENTION

The present invention relates to a system for controlling write actions to a plurality of data storage devices, the system comprising a plurality of write caches, wherein each cache is associated with a set of said data storage devices; and a controller adapted to issue write permissions to said data storage devices, said write permissions including a permission to perform a data destage operation from a cache to a data storage device.

The present invention further relates to a data storage product including such a system.

The present invention yet further relates to a method of controlling write actions including data destaging actions from a plurality of caches to a plurality of data storage devices.

The present invention yet further relates to a computer program product comprising computer program code implementing the aforementioned method when executed on one or more processors of a computer system.

BACKGROUND

Many computer architectures comprise one or more dedicated data storage systems handling write instructions from one or more hosts, e.g. application servers. Such hosts typically are capable of generating write instructions at a higher rate than the data storage systems are capable of handling. In order to avoid performance issues, such a data storage systems typically comprise a plurality of cache memories that receive and store the write instructions from the hosts and write these instructions to the appropriate device within the data storage system, e.g. a hard disk drive, tape or any other suitable storage device, at a later point in time. A cache management system informs the originating host that a write instruction has been completed when the received write data directed to a data storage device has been written to cache and before the write data is written out to the storage device. The write latency to the storage device is typically significantly longer than the latency to write to a cache memory. Consequentially, informing the originating host that a write instruction has been completed before the write data is written to the data storage device reduces write latency. Moreover, the presence of data in the cache memories allows for faster data access by the hosts as the data does not have to be retrieved from the data storage devices, as is of course well known per se.

It is well-documented that care has to be taken to ensure that the respective cache memories timely write, i.e. destage, the received write instructions to the respective data storage devices in order to ensure that it can still receive fresh write instructions from the hosts. It is far from trivial to meet this requirement. For instance, if a cache is allowed a high frequency of destage operations, this may keep the cache at a low occupancy level (i.e. most of the cache is empty), but this can seriously impact overall system performance, for instance because destage operations may interfere with read or other storage requests. On the other hand, if a cache is allowed a low frequency of destage operations, overall system performance can also suffer if the cache becomes full and the system is no longer able to consume write instructions in these caches, which can cause a severe increase in the latency of the system.

U.S. Pat. No. 7,394,069 B2 discloses a system for enabling and disabling cache in storage systems, including a method that changes a time period for delaying host requests received at a cache of a storage device and converts the storage device from a cache enabled state to a cache disabled state while the storage device is online. For instance, a wait time for such a request may be increased when the cache has an occupancy level of above a defined threshold to ensure that the cache is given more destaging bandwidth in order to prevent the cache from becoming full. A drawback of this approach is that performance of the system may be reduced during high workloads because caches have to handle a larger volume of write instructions, which can cause the occupancy levels of the caches to go up, consequently triggering the increase of the wait time on the host requests at a time when such wait times should be minimal.

Commonly known algorithms such as the WOW (Wise Ordering for Writes) algorithm apply a round-robin selection process for the various caches flagged as requiring to perform destage operations to give each cache access to the data storage devices at set periods in time. Caches there are not flagged as such will be overlooked. This is also far from ideal as this can cause problems in case a cache that has just been bypassed by the algorithm receives a large number of write instructions, with the cache subsequently having to wait for the round-robin algorithm to travel around all caches before considering the now overloaded cache again.

BRIEF SUMMARY OF THE INVENTION

The present invention seeks to provide a system for controlling write actions to a plurality of data storage devices in which the occupancy levels of the caches in the system are maintained without the risk of severely impacting on overall system performance.

The present invention further seeks to provide a data storage system including the aforementioned system for controlling these write actions.

The present invention yet further seeks to provide a method for controlling write actions to a plurality of data storage devices in which the occupancy levels of the caches in the system are maintained without the risk of severely impacting on overall system performance.

The present invention yet further seeks to provide a computer program product including computer program code implementing the aforementioned method when executed on one or more computer processors.

According to an aspect, there is provided a system for controlling write actions to a plurality of data storage devices, the system comprising a plurality of write caches, wherein each cache is associated with a set of said data storage devices; and a controller adapted to issue write permissions to said data storage devices, said write permissions including a permission to perform a data destage operation from a cache to a data storage device; wherein each cache has a first performance score expressed as the difference between the number of data destage operations said cache has in flight and the maximum number of data destage actions said cache is permitted to issue in parallel; and wherein the controller is adapted to offer a data destage operation permission to the cache in said plurality of caches associated with the highest first performance score.

The present invention is based on the insight that each cache typically is assigned a maximum number of destage operations the cache is allowed to perform in parallel. For instance, the system may be adapted to determine the maximum number of data destage operations a cache is permitted to issue in parallel based on the difference between a desired occupancy level and an actual occupancy level of said cache in order to ensure that caches that are relatively full are given a higher number of destage operations to perform in parallel.

In addition, by considering the difference between the number of destage operations in-flight and the maximum number of destage operations the cache is allowed to perform in parallel, i.e. by considering the first performance score, available destage operations can be assigned to those caches that have the highest need for such operations. This is the effect that a cache with a low occupancy level is unlikely to receive destage operation permissions, whereas a cache having a high occupancy level but few assigned destage operations is likely to receive a large proportion of the destage operations as they become available on the system. Consequently, occupancy levels across the caches are kept relatively constant, thereby avoiding performance penalties associated with the need to urgently assign large numbers of destage operations to caches to avoid them from spilling over. In particular, because the present invention does not rely on a round-robin algorithm, the risk that a needy cache is deprived from destage operations is significantly reduced.

In an embodiment, each data storage device has a second performance score expressed as the difference between the number of data destage operations said device has in flight and the maximum number of data destage operations said device is permitted to handle in parallel; and each cache is adapted to pass an offered data destage operation permission onto the data storage device in its set having the highest second performance score. This further improves efficiency of the destage assignment process, as destage operations can be assigned to those data storage devices that have most spare capacity for handling the destage operation. For instance, a data storage device such as a disk may have a target latency and a time-average latency, wherein the number of allowed destage operations the data storage device may handle may be defined as a function of the difference between the target latency and the time-average latency to ensure that data storage devices already suffering from increased latencies are not heavily loaded with relatively slow destaging operations.

Each data storage device may be adapted to refuse the offered data destage operation permission in case the number of data destage operations said device has in flight equals the maximum number of data destage operations said device is permitted to handle in parallel, and each cache is adapted to respond to such a refusal by passing the offered data destage operation permission onto the data storage device in its set having the next largest difference between the number of data destage operations said device has in flight and the maximum number of data destage operations said device is permitted to handle in parallel until one of said data storage devices accepts the offer or until all data storage devices have rejected the offer. This allows for a data storage device to push back an offered destage operation in case the data storage device cannot accept any further destage operations without negatively impacting on its latency. This therefore further improves control over the overall performance of the system.

Alternatively, each cache has knowledge of the respective second performance scores of the data storage devices in its set and is adapted to refuse said offer if none of the data storage devices in its set have a non-zero second performance score. This obviates the need to explicitly offer the destage operation to the underlying data storage devices, which improves the response time between the controller and the cache.

Upon the cache having the highest first performance score rejecting the offer, the controller may be adapted to redirect said offer to the cache in said plurality of caches associated with the next highest first performance score. The controller may be adapted to repeat this process until the offered destage operation is accepted by one of the caches. This ensures that if possible the destage operation will always be consumed by the most needy cache capable of accepting the offered destage operation.

In a particularly advantageous embodiment, the caches are organised in a plurality of groups ranked by association with a different range of first performance scores, the highest ranked group being associated with a range including the highest first performance score; and the controller is adapted to offer the data destage operation permission to a first cache in the highest ranked group; offer the data destage operation permission to a next cache in the highest ranked group in case the first cache rejects the offer; and offer the data destage operation permission to a cache in the next highest ranked group in case all caches in the highest ranked group have rejected the offer. This is particularly advantageous if the system comprises a large number of caches, where ordering these caches in a single list may become cumbersome. The available destage operations may be offered to caches within a single group in a round-robin fashion.

The controller may be further adapted to offer a number of data destage operation permissions to a selected cache, wherein said number is based on the first performance score of said cache and the rank of the group including said cache. This for instance can be used to distribute the available destage operations over multiple caches, where the number each cache receives may for instance be selected such that the allocated number of destage operations takes the cache to the group of next lower rank in order to ensure that occupancy levels between caches are kept similar.

In accordance with another aspect, there is provided a data storage system comprising a plurality of data storage devices and the system according to an embodiment of the present invention, wherein the system is adapted to control write actions to said plurality of data storage devices. Such data storage system exhibits improved latency characteristics due to the data destage scheduling strategy explained in more detail above.

In accordance with yet another aspect, there is provided a method of controlling write actions to a plurality of data storage devices including data destage operations from a plurality of caches, each of said caches being associated with a set of said data storage devices, the method comprising calculating a first performance score for each cache, wherein said first performance score is expressed as the difference between the number of data destage operations said cache has in flight and the maximum number of data destage actions said cache is permitted to issue in parallel; and offering a data destage operation permission to the cache associated with the highest first performance score.

The step of calculating the first performance score preferably further comprises defining a desired occupancy level for a cache; determining an actual occupancy level of said cache; and determining the maximum number of data destage operations a cache is permitted to issue in parallel based on the difference between said desired occupancy level and said actual occupancy level.

In an embodiment, the method further comprises calculating a second performance score for each data storage device, wherein the second performance score is expressed as the difference between the number of data destage operations said device has in flight and the maximum number of data destage operations said device is permitted to handle in parallel; offering the data destage operation permission to the data storage device in the set of the cache having the highest second performance score; rejecting the offer if none of the data storage devices in said set have a non-zero performance score; and offering the data destage operation permission to a cache having a next highest first performance score upon rejection of the offer by a cache having a higher first performance score until one of the caches has accepted the offer or until all caches have rejected the offer.

In a particularly advantageous embodiment, the method further comprises organizing the caches in a plurality of groups ranked by association with a different range of first performance scores, the highest ranked group being associated with a range including the highest first performance score; wherein the step of offering a data destage operation permission to the cache associated with the highest first performance score comprises offering the data destage operation permission to a first cache in the highest ranked group; offering the data destage operation permission to a next cache in said highest ranked group in case the first cache rejects the offer; and offering the data destage operation permission to a cache in a next highest ranked group in case all caches in the group associated with the highest ranked group have rejected the offer.

The method may further comprise offering a number of data destage operation permissions to a selected cache, wherein said number is based on the first performance score of said cache and the rank of the group including said cache.

The various embodiments of the method of the present invention benefit from the same advantages that have been explained in more detail above for the various corresponding embodiments of the system of the present invention.

In accordance with yet another aspect, there is provided a computer program product comprising a computer-readable storage medium storing computer program code that when executed on one or more processors of a computer system cause said one or more processors to implement an embodiment of the aforementioned method.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
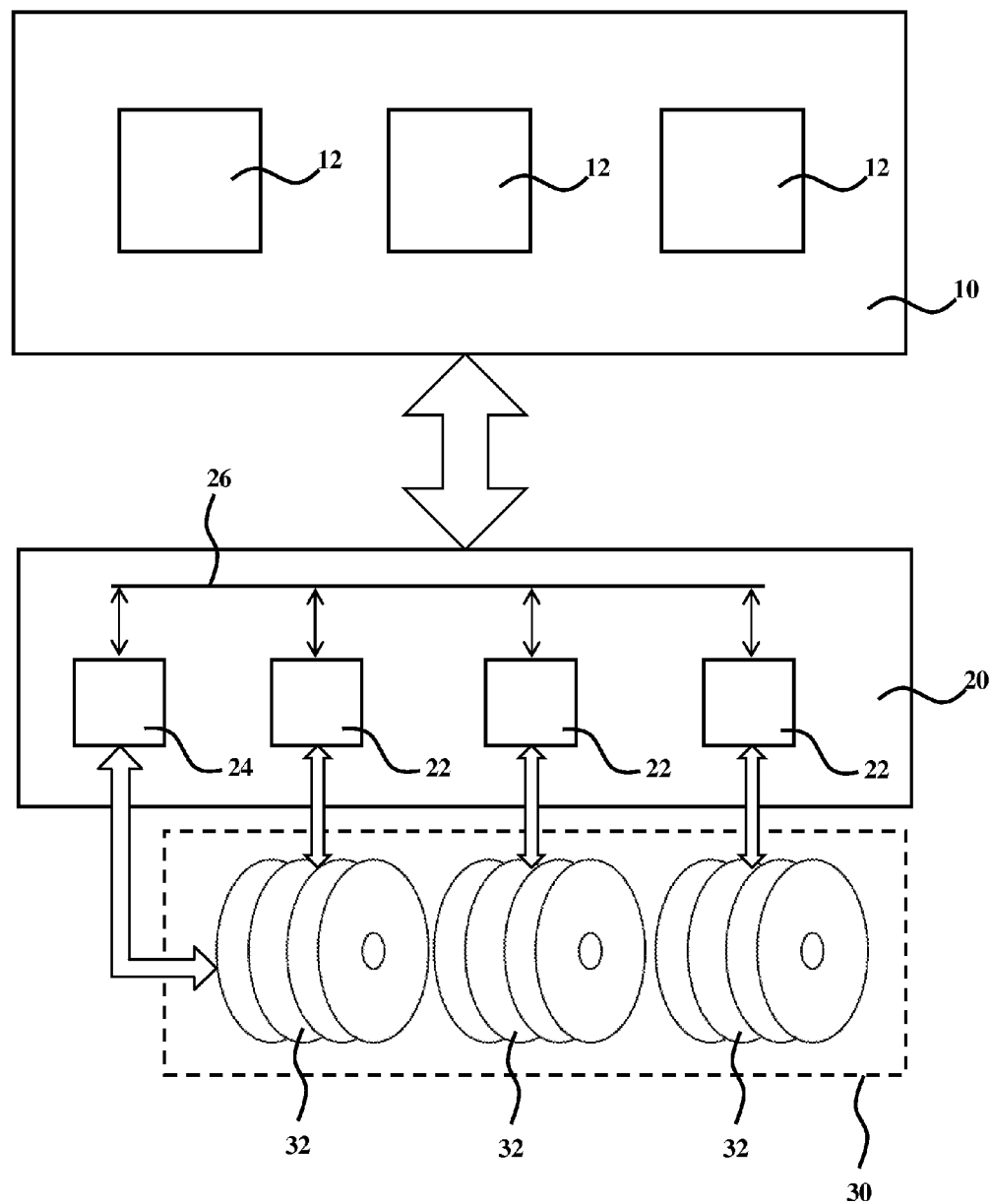
FIG. 1 schematically depicts a computer architecture including a system according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various embodiments of the method of the present invention may be stored on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

FIG. 1 schematically depicts a computer architecture 100 including a host system 10, a system 20 for controlling write actions to a plurality of data storage devices 32 and a data storage system 30 including the plurality of data storage devices 32. The host system 10 typically includes a number of host applications 12 that are hosted by one or more computer devices, e.g. computer servers. The host applications 12 typically generate write and read requests directed at the data storage system 30, in particular directed at one of the data storage devices 32.

In an embodiment, such requests are handled by the system 20, which typically includes a number of write caches 22 and a controller 24, which controller may be adapted to handle the write and read requests from the host applications 12 and further adapted to ensure that certain performance requirements of the host system 10, such as for instance bandwidth and/or latency requirements, are met. The write caches 22 and controller 24 may be communicatively coupled in any suitable manner, e.g. using a bus 26 or by using point-to-point interconnections.

In an embodiment, each write cache 22 is associated with a (sub)set of the data storage devices 32. The respective sets associated with the respective write caches 22 may be overlapping or non-overlapping sets, i.e. in some embodiments different write caches 22 may share responsibility for a data storage device 32, whereas in some other embodiments each data storage device 32 is assigned to a single write cache 22 only. The write caches 22 may take any suitable form, e.g. may be non-volatile memory, battery-backed volatile memory and so on. In FIG. 1, the caches 22 are shown to have direct access to the respective sets of data storage devices 32, as indicated by the two-way arrows between a cache 22 and a set of data storage devices 32. It should however be understood that it is equally feasible that the caches 22 has access to these respective sets through the controller 24. In an embodiment, the controller 24 may be a central processing unit (CPU) adapted to handle a variety of tasks including management of the destaging of write requests from the caches 22. In this embodiment, destage requests can only be granted to the caches 22 when the CPU has spare capacity to handle the destage operations, as such operations should not interfere with higher priority tasks of the CPU.

The data storage system 30 may be a single system or a distributed system of data storage devices 32. In some embodiments, the data storage system 30 is a distributed system comprising a plurality of data storage devices 32, wherein at least some of the data storage devices 32 may have different performance characteristics to some of the other data storage devices 32. For instance, the data storage devices 32 may be hard disk drives of different performance, e.g. SAS or SATA disks, may be disks accessible via data paths of different latency, e.g. some of the disks may be optically accessible through fiber channels whereas others may be electrically accessible through metal-based channels, some of the data storage devices 32 may be magnetic tape-based storage devices, and so on. Any suitable type of data storage device 32 may be considered in the context of the present invention.

In an embodiment, the system 20 forms part of the data storage system 30. In an alternative embodiment, the system 20 forms part of the host system 10. In yet another embodiment, the system 20 is a discrete system handling communication between the host system 10 and the data storage system 30. In an embodiment, the controller 24 is a CPU of the data storage system 30. In an alternative embodiment, the controller 24 is a CPU of the host system 10. In these embodiments, the system 20 may be adapted to handle communication between the host system 10 and one or more data storage systems 30.

As is known per se, the write caches 22 are adapted to receive write requests from one or more of the host applications 12 and to return a write confirmation to the destination host application 12 upon storing the write request. As previously explained, this ensures that the host applications 12 do not suffer latency issues caused by the relatively slow writing of the request to the target data storage device 32, as the write request can be stored almost instantaneously in the write cache 22. Consequently, by decoupling the reception of the write request and the execution of the write request into storage, the latency experienced by the host applications 12 is minimized. Of course, the write requests stored in the respective caches 22 must at some point in time be destaged to the target storage device 32 in order to maintain data consistency at the data storage device as well as to ensure that the cache 22 does not overflow.

As previously explained, in order to achieve optimal system performance, the controller 24 has the task of ensuring that the occupancy levels of the respective caches 22 are kept at an optimal level, e.g. a level that strikes a good balance between available storage and frequency of destaging. In particular, during periods in which the controller 24 is busy, e.g. has to handle tasks of a higher priority and/or has to handle large volume of high priority access requests to the data storage system 30, the controller 24 cannot handle a large number of destage operations at the same time, as this will increase the latency of the high priority tasks of the controller 24.

Embodiments of the present invention are directed at ensuring that destage operations are handled during periods in which the controller 24 has spare capacity, and that during such periods the destage operations are assigned to the most deserving cache(s) 22 using a smart algorithm that avoids round-robin procedures over all the caches 22, thereby significantly decreasing the risk of cache overload and improving the homogeneity of occupancy levels over the various caches 22.

To this end, the various components of the system 20 are adapted to implement an algorithm that embodies one or more embodiments of a method of the present invention, which algorithm and method will be explained in further detail with the aid of FIG. 2-5.

Figure 2:
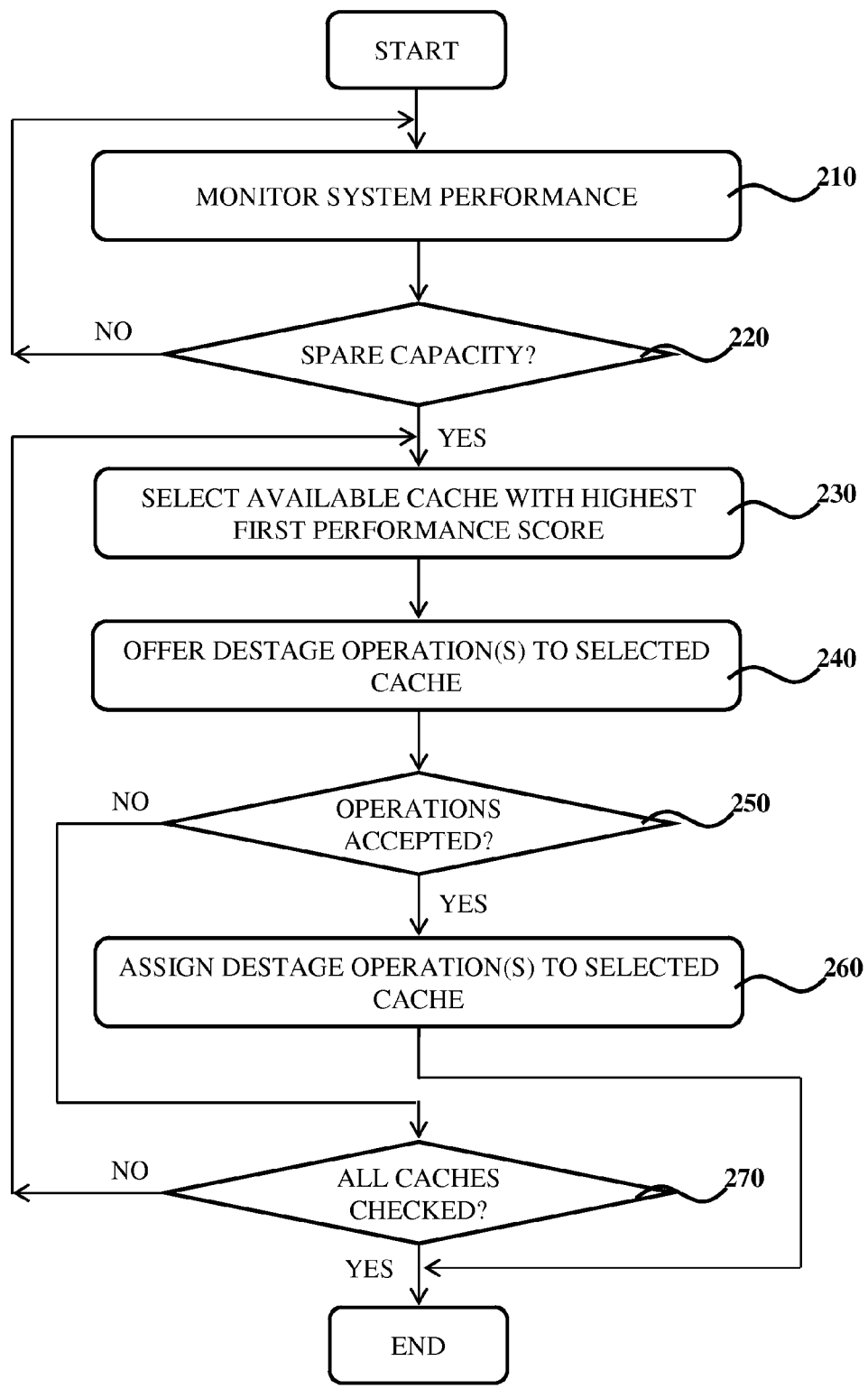
FIG. 2 schematically depicts a flowchart of a method according to an embodiment of the present invention.

FIG. 2 depicts the general principle of a method in accordance with an embodiment of the present invention. The method starts by proceeding to step 210 in which the performance of the overall system is monitored. Specifically, it is monitored if there is spare capacity to handle destage operations without impacting on the latency of other running processes, e.g. other processes handled by the controller 24. Step 220 checks if such spare capacity is available. In the absence of such spare capacity, the method returns to step 210. However, if the controller 24 can handle and/or issue data destage operations to one or more of the caches 22, the method proceeds to step 230.

In step 230, the controller 24 identifies the cache 22 having the highest first performance score. In the context of the present invention, the highest first performance score is expressed as the difference between the maximum number of data destage operations a particular cache 22 is allowed to perform in parallel and the actual number of data destage operations that particular cache has in-flight; i.e. the number of data destage operations that are in progress between that particular cache 22 and one of the data storage devices 32. This will be explained in more detail with the aid of FIG. 3.

Figure 3:
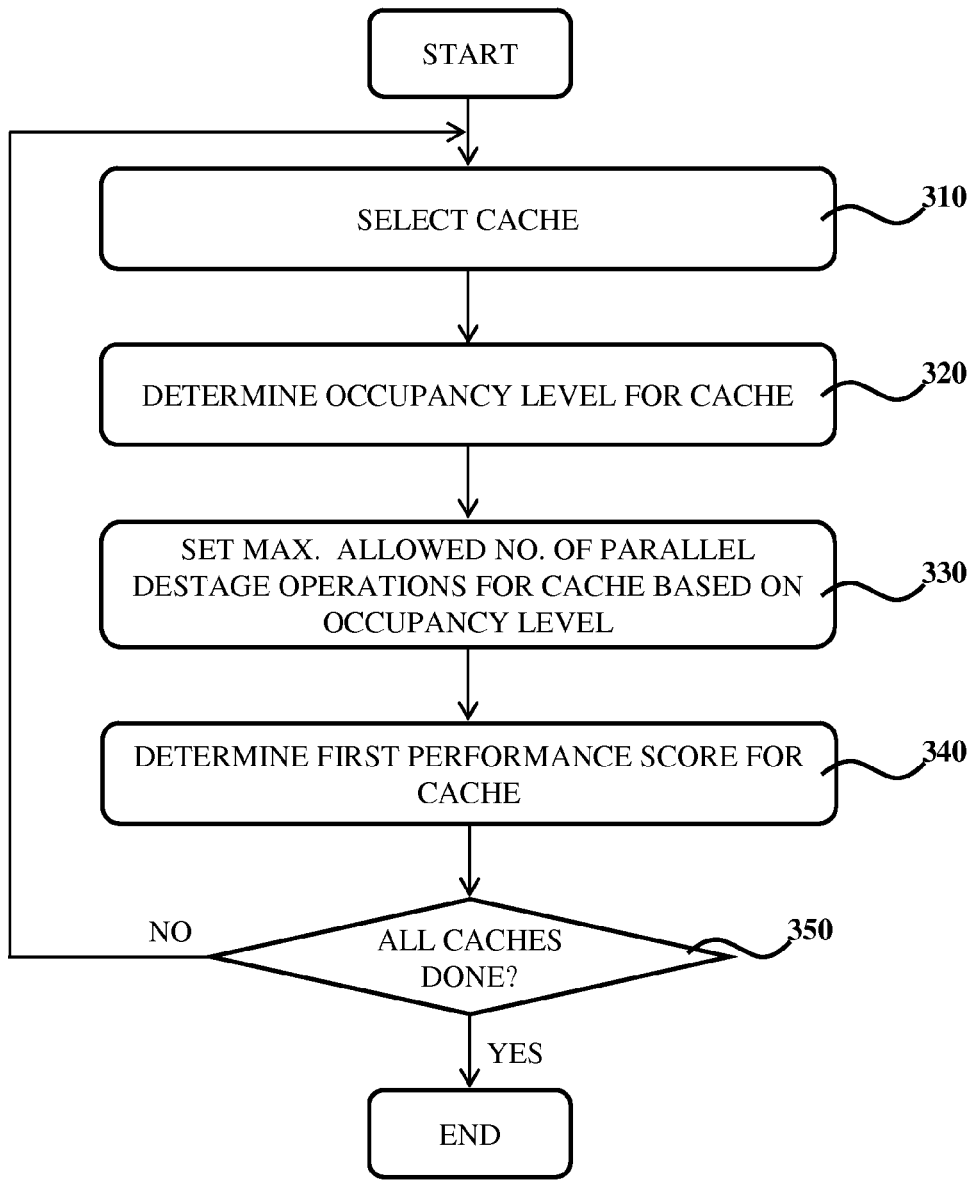
FIG. 3 schematically depicts a flowchart of an aspect of a method according to an embodiment of the present invention.

FIG. 3 depicts a flowchart of an example method of how the first performance score for a cache 22 may be calculated. The method 300 starts by proceeding to step 310 in which a cache 22 is selected. In step 320, the occupancy level of the selected cache 22 is determined. The occupancy level may be expressed in any suitable way, for instance as a percentage of fullness of the cache 22. The occupancy level can be used as a metric to decide the maximum number of data destage operations the selected cache 22 is permitted to perform at the same time, i.e. in parallel. Typically, a cache 22 having a high occupancy level will be assigned a larger number of permitted parallel data destaging operations then a cache 22 having a low occupancy level, as the cache 22 with the high occupancy level has a higher need to reduce the amount of write requests stored in the cache 22, as previously explained.

In step 330, the selected cache 22 is assigned a maximum number of data destage operations the selected cache 22 is permitted to operate in parallel at a given point in time based on the occupancy level of the selected cache 22. The exact number of data destage operations assigned to the cache may be based on system requirements, and may change between various systems.

The method then proceeds to step 340 in which the first performance score is calculated for the selected cache 22. As mentioned above, this score is expressed as the difference between the maximum number of data destage operations assigned to the selected cache in step 330 and the actual number of data destage operations the selected cache 22 currently has in-flight. In step 350 it is checked if the first performance score has been calculated for every cache 22; if this is not the case the method returns to step 310 in which the next cache 22 is selected, otherwise the method terminates.

It is noted that the method 300 does not have to be performed immediately prior to step 230 of the method 200 in FIG. 2. It is for instance equally feasible that the controller 24 keeps track of the occupancy levels of the various caches 22 and changes to the first performance score of these caches 22, e.g. by periodically checking this score, by updating this score as soon as a cache 22 signals a change in its occupancy level and/or a change in the number of data destage operations it has in-flight, and so on. Many suitable variations will be apparent to the skilled person. Similarly, it is not necessary to perform the various steps of the method 300 immediately after each other. It is for instance equally feasible to have a delay between steps 330 and 340, because it may not be necessary to calculate the first performance score until the controller 24 has fresh data destage operations to assign to selected caches 22.

Now upon returning to FIG. 2, after the controller 24 has selected the cache 22 having the highest first performance score, the method proceeds to step 240 in which the controller 24 offers one or more data destage operations to the selected cache 22. In accordance with a particularly advantageous embodiment of the present invention, the cache 22 has the ability to accept or reject the offered data destage operation. This will be explained in further detail with the aid of FIG. 4.

In an embodiment of the present invention, each data storage device 32 may be assigned a second performance score, which score is expressed as the difference between the maximum number of data destage operations the device is permitted to handle in parallel and the actual number of data destage operations the data storage device 32 is currently handling. This score therefore is an expression of how many more data destage operations the data storage device 32 can handle before these operations start to have a negative impact on the latency of the data storage device 32.

For instance, a data storage device 32 such as a disk may have a target latency and an average latency measured over a certain time period, preferably the most recent time period, i.e. the time period up to the present point in time. The number of data destage operations the data storage device 32 is permitted to handle in parallel may be expressed as a function of the difference between the target latency and the average latency. For instance, in case a data storage device 32 has a below average latency, this is an indication of the device not being particularly busy at present such that the device can handle a large number of data destage operations then a data storage device 32 exhibiting an average latency above its target latency. The second performance score of the data storage devices 32 preferably is updated after every defined time period to ensure that changes in the latency of a data storage device 32 is timely captured, thereby avoiding that the latency of a data storage device 32 is negatively impacted by having to handle an excessive number of data destaging operations during busy periods.

In an embodiment, the average latency of the data storage device 32 may also be taken into consideration when assigning the number of data destage operations the data storage device 32 is allowed to handle in parallel. This may for instance be useful when the data storage system 30 comprises data storage devices 32 of different type, i.e. of different latency such that high-latency devices can be given fewer data destage operations compared to low-latency devices, thereby ensuring that overall performance of the data storage system 30 is not negatively impacted by a high-latency data storage device 32 having to handle large volumes of data destage operations at the same time.

Figure 4:
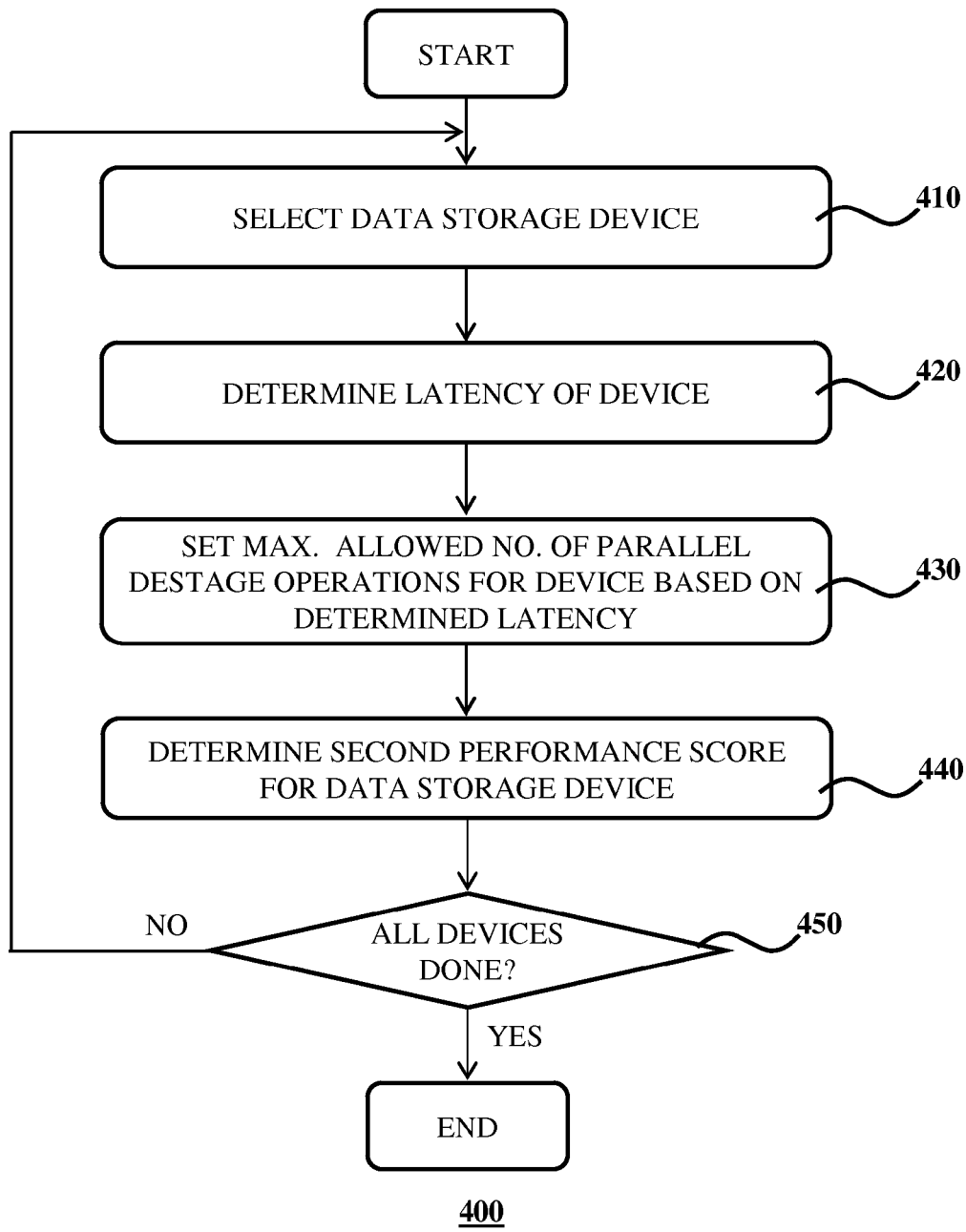
FIG. 4 schematically depicts a flowchart of another aspect of a method according to an embodiment of the present invention.

FIG. 4 depicts a flowchart of a method 400 that at least in part may be implemented by a controller of the data storage device 32. The method 400 starts by proceeding to step 410, in which a data storage device 32 is selected, after which the average latency of the selected data storage device 32 is determined in step 420. As previously explained, the difference between the determined average latency of the selected data storage device 32 and its target latency is used to assign a maximum number of data destage operations the selected data storage device 32 is permitted to handle in parallel, as shown in step 430. This number is used in step 440 to calculate the second performance score for the selected data storage device 32. In step 450, it is checked if the second performance score has been calculated for all data storage devices 32; if not the method returns to step 410 in which the next data storage device 32 is selected, otherwise the method terminates.

Now, upon returning to FIG. 2, when in step 240 the selected cache 22 is offered the data destage operation, the cache 22 checks if one of the data storage devices 32 in its set of data storage devices has a second performance score greater than zero; i.e. whether there is a data storage device 32 in its set that has spare capacity to handle the offered data destage operation. Preferably, the cache 22 selects the data storage device 32 having the highest second performance score, such that the data destage operations that the cache 22 has in-flight are distributed over its data storage devices 32 in a balanced manner. To this end, the cache 22 may offer the available data destage operation to the data storage device 32 having the highest second performance score, which data storage device 32 may accept or reject the offer, for instance because the data storage device 32 in the meantime has become busy and does not want to handle the additional task. In the event of a rejection, the cache 22 may offer the available data destage operation to the data storage device 32 having the next-highest second performance score until one of the data storage devices 32 has accepted the additional data destage operation, in which case the cache 22 accepts the offered data destage operation in step 250, or until all data storage devices 32 in the set of data storage devices of the cache 22 have rejected the offered data destage operation, in which case the cache 22 rejects the offer in step 250.

In the above embodiment, the decision to accept or reject an available data destage operation lies with the data storage device 32. However, it is equally feasible that this decision is made by the cache 22, for instance by a cache 22 keeping track of the respective second performance scores of the data storage devices 32 in its set and by making the decision on behalf of the data storage devices 32 based on this knowledge.

The above principle can be demonstrated with a simple example in which the system 20 comprises two caches 22 each comprising two data storage devices 32 in their respective sets. For this example the caches 22 are labeled P1 and P2, where P1 contains data storage devices P1D1 and P1D2, whereas P2 contains data storage devices P2D1 and P2D2.

At a point in time when a data destage operation is to be offered to one of the caches 22, P1 is 50% full such that P1 is assigned a maximum allowed destage operations of 10. P1 currently has 1 active destage operation in flight, so has a first performance score of 10−1=9.

P1D1 is a fast data storage device e.g. is a fast disk having low latency, such that P1D1 has been assigned a maximum allowed destage operations of 20. P1D1 currently has 1 active destage operation in flight, so has a second performance score of 20−1=19.

P1D2 is a slow data storage device, e.g. a slow disk having relatively high latency, such that P1D2 is only allowed a maximum number of parallel destage operations of 1. P1D2 currently has no active destage operations in flight, so has a second performance score of 1−0=1.

At the same time, P2 is 90% full and therefore has been assigned the higher number of maximum allowed parallel destage operations of 100 to reflect the higher need of P2 to downwardly adjust its occupancy level. P2 currently has 20 active destage operations in flight, so has a first performance score of 100−20=80.

P2D1 has been assigned a maximum number of parallel destage operations of 10 and currently has 10 active destage operations in flight. Hence, P2D1 has a second performance score of 10−10=0.

P2D2 has been assigned a maximum number of parallel destage operations of 10 and currently has 10 active destage operations in flight. Hence, P2D2 also has a second performance score of 10−10=0.

In this example scenario, when a data destage operation becomes available, P2 has the highest first performance score so is offered the data destage operation first. As both of its data storage devices, e.g. disks, have the same second performance score (0), these devices may be offered the data destage operation in either order. Depending on the chosen implementation, the data destage operation is either offered to the first one of the data storage devices that declines the offer as it is already running at maximum capacity, i.e. has a second performance score of zero, and subsequently offered to the other data storage device that also declines the offer for the same reason. As explained above, it is also feasible in an alternative implantation that the data storage devices are ignored, with instead the cache declining the offered data destage operation.

Because P2 has rejected the offer, the data destage operation is subsequently offered to cache P1. As P1D1 has a higher second performance score than P1D2, the additional data destage operation is offered to P1D1, which will accept the offered data destage operation which causes the second performance score of P1D1 to be reduced to 18.

It should be understood that this example is intended to demonstrate the above principle in a clear and concise manner, and should not be understood as a preferred or limiting embodiment of the present invention. The computer architecture targeted in some embodiments of the present invention has a large number of caches 22 and a large number of data storage devices 32, e.g. hundreds or thousands of such resources.

The above example highlights an important aspect of at least some embodiments of the present invention, namely that despite a cache 22 being able to accept an offered data destage operation based on its first performance score, the underlying data storage devices 32 have the authority to push back the offered data destage operation to the controller 24 in case the data storage devices are unable to handle the additional operation without performance penalty, as for instance expressed by their respective second performance scores. This embodiment therefore strikes a balance between the needs of the caches 22 and the needs of the underlying data storage resources 32, thereby ensuring that maintaining the occupancy levels of the caches 22 at desired levels is not achieved at the expense of reduced performance of the data storage system 30.

Now, upon returning to FIG. 2, if a cache 22 has accepted the offered data destage operation, the method proceeds to step 260 in which the offered data destage operation is assigned to that cache 22 by the controller 24. If on the other hand the selected cache 22 has rejected the offer to data destage operation, the method proceeds to step 270 where it is checked if all caches 22 have been offered the available data destage operation, and if this is not the case, returns to step 230 in which the cache 22 with the next highest first performance score is selected. In FIG. 2, this has been identified as the available cache with the highest first performance score, because the cache 22 that already rejected the data destage operation on offer is no longer available to offer the data destage operation to. This process is repeated until one of the caches 22 accepts the data destage operation on offer or until all caches 22 have rejected the offer, in which case the method terminates.

The embodiment shown in FIG. 2 is particularly suitable for use on systems 20 having a relatively small number of caches 22. However, some embodiments of the system 20 may comprise a relatively large number of caches 22 and/or may be capable of assigning relatively large numbers of data destage operations in one go, in which case it may become cumbersome to select a cache 22 on an individual basis, for instance because many caches 22 may have the same first performance score, such that additional decision-making processes are required to select a cache 22 to offer the data destage operation(s) to.

Figure 5:
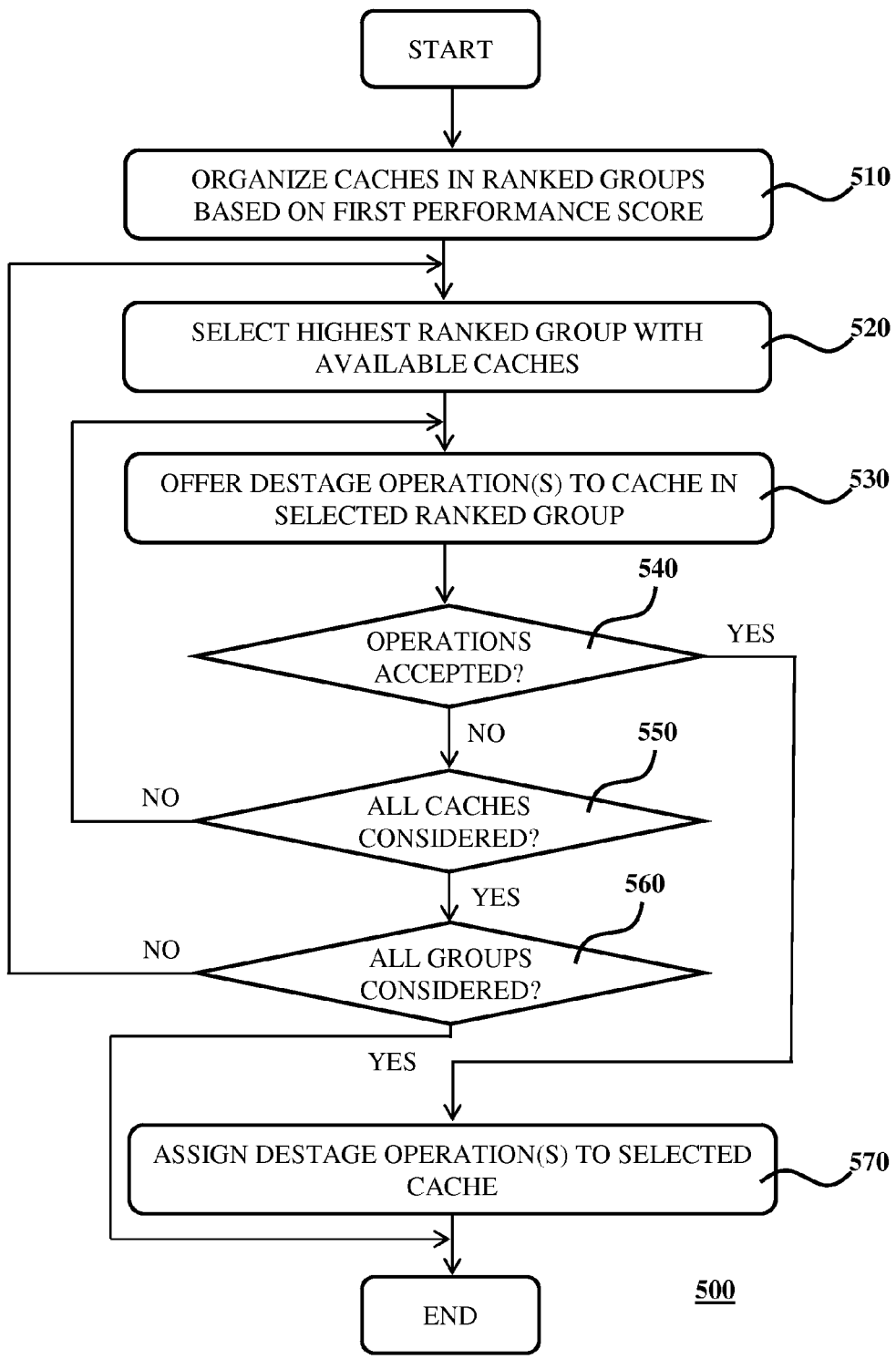
FIG. 5 schematically depicts a flowchart of a method according to another embodiment of the present invention.

FIG. 5 depicts a flowchart of a method 500 that can be used to assign data destage operations to caches 22 in such larger systems 20. The method starts by proceeding to step 510 in which the caches 22 are organized in groups, with each group being characterized by being associated with a range of values of the first performance scores, with the groups being ranked in order of descending ranges, for instance a first ranked group may comprise caches 22 having a first performance score in a range of 100 or more, a second ranked group may comprise caches 22 having a first performance score in a range of 75-99, a third ranked group may comprise caches 22 having a first performance score in a range of 50-74, a fourth ranked group may comprise caches 22 having a first performance score in a range of 25-49 and so on. It should be understood that these are arbitrary ranges and that the end points of these ranges may have any suitable value depending on the particular application.

In an embodiment, the lowest ranked group may comprise caches 22 having a first performance score of 0, as this prevents unnecessarily offering a data destage operation to a cache that never can accept the operation.

In step 520, the highest ranked group having available caches 22, i.e. having at least one cache 22 that has not yet rejected the data destage operation(s) on offer, is selected and in step 530 the data destage operation(s) on offer are offered to a selected cache 22 within the selected group. The cache 22 may be selected in any suitable manner, for instance using a round-robin algorithm.

If the selected cache 22 in the selected group accepts the data destage operation(s) on offer, as checked in step 540, the method proceeds to step 570 in which the data destage operation(s) on offer are assigned to that cache. If this cache 22 however rejects the data destage operation(s) on offer, it is checked in step 550 if all caches 22 within the group have been offered the data destage operation(s) on offer. If this is not the case, the method returns to step 530 in which the data destage operation(s) on offer are offered to the next cache 22 in line.

If on the other hand it is decided in step 550 that all caches 22 within the selected group have rejected the data destage operation(s) on offer, the method proceeds to step 560 where it is checked if all groups have been considered. If not, the method returns to step 520 where the next highest ranked group is selected and the process is repeated until all groups have been considered, in which case the method terminates.

As previously mentioned, it is feasible that the controller 24 may have a plurality of data destage operation(s) on offer at the same time. If this is the case, the number of data destage operations that are offered to any selected cache 22 may be based on the first performance score of said cache and the rank of the group to which the cache belongs. For instance, the controller 24 may decide to offer a number of data destage operations to the selected cache 22 that will take the selected cache 22 from its present group to a group with a different, e.g. target, rank, for instance a rank that is associated with a desired occupancy level or the next rank down.

As an example, a selected cache 22 may have a first performance score of 120 and therefore belongs to the highest ranked group in the above example ranking table. At the same time, the controller 24 may have 120 data destage operations on offer. In this embodiment, the controller 24 may decide to offer the selected cache 22 a total of 21 data destage operations in order to take the selected cache 22 into the second ranked group, as its first performance score will drop to 99. The remaining 99 data destage operations on offer may be allocated to appropriate caches 22 by re-applying the method 500 to the remaining caches 22. This ensures that large volumes of available data destage operations, which for instance can become available in bursts when the overall system goes into a state of low activity, are more evenly distributed over the caches 22 having the highest first performance scores, which improves the overall balance and fairness across the system 20.

Such balance may be further improved by using smaller first performance score ranges for the respective groups, although reducing the graininess of the groups increases the time it takes to distribute available data destage operations. It will be understood that the balance between graininess and distribution times may be While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A system for controlling write actions to a plurality of data storage devices, the system comprising:
    a plurality of write caches, wherein each cache is associated with a set of said data storage devices; and
    a controller adapted to issue write permissions to said data storage devices, said write permissions including a permission to perform a data destage operation from a cache to a data storage device,
    wherein each cache has a first performance score expressed as the difference between the number of data destage operations said cache has in flight and the maximum number of data destage actions said cache is permitted to issue in parallel,
    wherein the controller is adapted to offer a data destage operation permission to the cache in said plurality of caches associated with the highest first performance score,
    each data storage device has a second performance score expressed as the difference between the number of data destage operations said device has in flight and the maximum number of data destage operations said device is permitted to handle in parallel,
    each cache is adapted to pass an offered data destage operation permission onto the data storage device in its set having the highest second performance score,
    each data storage device is adapted to refuse the offered data destage operation permission in case the number of data destage operations said device has in flight equals the maximum number of data destage operations said device is permitted to handle in parallel, and
    each cache is adapted to respond to such a refusal by passing the offered data destage operation permission onto the data storage device in its set having the next largest difference between the number of data destage operations said device has in flight and the maximum number of data destage operations said device is permitted to handle in parallel until one of said data storage devices accepts the offer or until all data storage devices have rejected the offer.

2. The system of claim 1, wherein the system is adapted to determine the maximum number of data destage operations a cache is permitted to issue in parallel based on the difference between a desired occupancy level and an actual occupancy level of said cache.

3. The system of claim 1, wherein each cache has knowledge of the respective second performance scores of the data storage devices in its set and is adapted to refuse said offer if none of the data storage devices in its set have a non-zero second performance score.

4. The system of claim 1, wherein the controller is adapted to redirect said offer to the cache in said plurality of caches associated with the next highest first performance score in response to the cache having the highest first performance score rejecting the offer.

5. The system of claim 1, wherein:
    said caches are organized in a plurality of groups ranked by association with a different range of first performance scores, the highest ranked group being associated with a range including the highest first performance score; and
    the controller is adapted to:
        offer the data destage operation permission to a first cache in the highest ranked group;
        offer the data destage operation permission to a next cache in the highest ranked group in case the first cache rejects the offer; and
        offer the data destage operation permission to a cache in the next highest ranked group in case all caches in the highest ranked group have rejected the offer.

6. The system of claim 5, wherein the controller is adapted to offer a number of data destage operation permissions to a selected cache, wherein said number is based on the first performance score of said cache and the rank of the group including said cache.

7. A data storage system comprising the system of claim 1 and the plurality of data storage devices, wherein the data storage system is adapted to control write actions to said plurality of data storage devices.

8. A method of controlling write actions to a plurality of data storage devices including data destage operations from a plurality of caches, each of said caches being associated with a set of said data storage devices, the method comprising:
    calculating a first performance score for each cache, wherein said first performance score is expressed as the difference between the number of data destage operations said cache has in flight and the maximum number of data destage actions said cache is permitted to issue in parallel;
    offering a data destage operation permission to the cache associated with the highest first performance score;

calculating a second performance score for each data storage device, wherein the second performance score is expressed as the difference between the number of data destage operations said device has in flight and the maximum number of data destage operations said device is permitted to handle in parallel;

offering the data destage operation permission to the data storage device in the set of the cache having the highest second performance score;

rejecting the offer if none of the data storage devices in said set have a non-zero performance score; and offering the data destage operation permission to a cache having a next highest first performance score upon rejection of the offer by a cache having a higher first performance score until one of the caches has accepted the offer or until all caches have rejected the offer.

9. The method of claim 8, wherein the step of calculating the first performance score further comprises:

defining a desired occupancy level for a cache;

determining an actual occupancy level of said cache; and determining the maximum number of data destage operations a cache is permitted to issue in parallel based on the difference between said desired occupancy level and said actual occupancy level.

10. The method of claim 8, further comprising organizing the caches in a plurality of groups ranked by association with a different range of first performance scores, the highest ranked group being associated with a range including the highest first performance score, wherein:

the step of offering a data destage operation permission to the cache associated with the highest first performance score comprises offering the data destage operation permission to a first cache in the highest ranked group, offering the data destage operation permission to a next cache in said highest ranked group in case the first cache rejects the offer, and offering the data destage operation permission to a cache in a next highest ranked group in case all caches in the group associated with the highest ranked group have rejected the offer.

11. The method of claim 10, further comprising offering a number of data destage operation permissions to a selected cache, wherein said number is based on the first performance score of said cache and the rank of the group including said cache.

12. A computer program product comprising a non-transitory computer-readable storage medium storing computer program code that when executed on one or more processors of a computer system cause said one or more processors to implement the method of claim 8.

* * * * *